United States Patent
Somerville et al.

(10) Patent No.: US 10,559,040 B2
(45) Date of Patent: Feb. 11, 2020

(54) SECURITY SYSTEM THAT TRACKS EMPLOYEES ON SITE AND HOURS WORKED

(71) Applicant: ADT US HOLDINGS, INC., Boca Raton, FL (US)

(72) Inventors: Brandon Somerville, Cambridge, NY (US); Tonya Somerville, Cambridge, NY (US)

(73) Assignee: The ADT Security Corporation, Boca Raton, FL (US)

( * ) Notice: Subject to any disclaimer, the term of this patent is extended or adjusted under 35 U.S.C. 154(b) by 477 days.

(21) Appl. No.: 15/294,109

(22) Filed: Oct. 14, 2016

(65) Prior Publication Data

US 2017/0109836 A1 Apr. 20, 2017

Related U.S. Application Data

(60) Provisional application No. 62/242,586, filed on Oct. 16, 2015.

(51) Int. Cl.
*G06Q 40/00* (2012.01)
*G06Q 10/00* (2012.01)
*G06Q 10/10* (2012.01)

(52) U.S. Cl.
CPC ......... *G06Q 40/125* (2013.12); *G06Q 10/00* (2013.01); *G06Q 10/10* (2013.01)

(58) Field of Classification Search
CPC ...... G06Q 10/00; G06Q 10/06; G06Q 10/103; G06Q 10/10; G06Q 40/00; H04M 15/04; H04M 15/06; H04M 11/04; G08B 25/00
USPC ............ 705/30, 33, 32, 50; 379/37, 114.01; 235/382.5; 340/431, 425.5, 5.3
See application file for complete search history.

(56) References Cited

U.S. PATENT DOCUMENTS

| | | | | |
|---|---|---|---|---|
| 3,906,447 A | * | 9/1975 | Crafton | G07C 9/00103 235/382.5 |
| 6,883,709 B2 | | 4/2005 | Joseph | |
| 7,136,711 B1 | | 11/2006 | Duncan et al. | |
| 8,671,035 B2 | * | 3/2014 | Bold | G06Q 40/12 705/30 |
| 9,098,831 B1 | * | 8/2015 | Miles | G06Q 10/105 |
| 2002/0027502 A1 | * | 3/2002 | Mayor | G08B 25/14 340/431 |

(Continued)

FOREIGN PATENT DOCUMENTS

EP 0104767 B1 3/1990

*Primary Examiner* — Olusegun Goyea
(74) *Attorney, Agent, or Firm* — Christopher & Weisberg, P.A.

(57) ABSTRACT

A controller and method are provided. The controller includes processing circuitry configured to activate premises security monitoring of a premises if the controller is armed. The processing circuitry includes a memory and a processor. The memory contains instructions that, when executed by the processor, configure the processor to determine that data to disarm the controller has been received, disarm the controller based on the received data, and in response to disarming the controller, track timekeeping payroll records of a plurality of predefined users associated with the premises. The disarming of the controller deactivates premises security monitoring by the controller. The timekeeping payroll records includes at least one of clock-in data and clock-out data.

19 Claims, 7 Drawing Sheets

(56) References Cited

U.S. PATENT DOCUMENTS

| | | | |
|---|---|---|---|
| 2002/0133725 A1* | 9/2002 | Roy | G06K 9/00006 726/5 |
| 2003/0167193 A1 | 9/2003 | Jones et al. | |
| 2005/0036588 A1* | 2/2005 | Alexander Elliot | H04M 11/04 379/37 |
| 2008/0114683 A1* | 5/2008 | Neveu | G06Q 10/06 705/50 |
| 2008/0284580 A1* | 11/2008 | Babich | G08B 13/19684 340/502 |
| 2010/0100464 A1* | 4/2010 | Ellis | G06Q 10/06 705/33 |
| 2013/0201286 A1* | 8/2013 | Schockmel | G07C 9/00111 348/46 |
| 2013/0268128 A1* | 10/2013 | Casilli | G05D 23/19 700/276 |
| 2014/0062651 A1 | 3/2014 | Sweatte | |
| 2015/0310565 A1* | 10/2015 | Fairbanks | H04L 63/0815 705/32 |
| 2015/0363745 A1* | 12/2015 | Hatch | G06Q 10/1091 705/32 |
| 2016/0063446 A1* | 3/2016 | Shaaban | G06Q 10/1091 705/32 |

\* cited by examiner

History

Summary | History | Alerts | Automations | Schedules | System | Employee Mgmt
All | Alerts | Automations | Schedules | Notable Events | Pictures/Clips | Site Access | System Selected Devices: All Devices    Time Period: Past 24 Hours Today 12:21 PM – Clock-in Paul
Today 12:04 PM – Outdoor lights set to On by automation Ambush Alley Open.
Today 12:04 PM – Ambush Alley (Zone 25) changed to Open.
Today 12:04 PM – Back Yard Cam (OC810) chagned to Motion.
Today 12:04 PM – Back Yard Cam (OC810) Changed to No Motion.
Today 12:03 PM – Outdoor Lights set to Off by Mum
Today 12:00 PM – Back Yard Cam (OC810) changed to Motion.
Today 12:00 PM – Back Yard Cam (OC810) changed to Motion.
Today 12:00 PM – Back Yard Cam (OC810) changed to Motion.
Today 12:00 PM – Back Yard Cam (OC810) changed to Motion.
Today 11:55 AM – Outdoor Lights set to On by schedule ambush.
Today 11:53 AM – Automation with trigger Front Door and action Set Shift to Be Right Back was delected by Mum
Today 11:53 AM – Automation with trigger Ambush Alley and action icSet Thermostat (TBZ48) to Heat to ic70 was deleted by Mum
Today 11:53 AM – Clock-in Jane
Today 11:52 AM – Outdoor Lights set to Off by Mum
Today 11:51 AM – Back Yard Cam (OC810) changed to Motion
Today 11:51 AM – Back Yard Cam (OC810) changed to Motion
Today 11:50 AM – Clock-in Brian
Today 11:50 AM – Schedule Una-Shift2 deleted by Mum
Today 11:50 AM – Schedule Una-Shift1 deleted by Mum

SECURITY SYSTEM THAT TRACKS EMPLOYEES ON SITE AND HOURS WORKED

CROSS-REFERENCE TO RELATED APPLICATION

This application is related to and claims priority to U.S. Provisional Patent Application Ser. No. 62/242,586, filed Oct. 16, 2015, entitled "SECURITY SYSTEM THAT TRACKS EMPLOYEES ON SITE AND HOURS WORKED", the entire contents of which are hereby incorporated herein by reference.

STATEMENT REGARDING FEDERALLY SPONSORED RESEARCH OR DEVELOPMENT n/a

TECHNICAL FIELD

The present invention relates to payroll tracking systems, and in particular to a method, controller and system for providing security monitoring and timekeeping payroll record tracking.

BACKGROUND

The demand for security systems that monitor businesses for alarm condition has continued to grow as more business owners seek to protect their premises from various hazards and threats. Such threats includes fire, flooding, robbery, break-ins, etc., that may be monitored and reported to a monitoring station. When a sensor such as a motion detector is triggered, a representative at a remote monitoring center receives an alarm event code and initiates a response process, including contacting a homeowner or others on a contact list and/or first responders such as local firefighters and/or police to request a dispatch to investigate the event at the premises being monitored.

In addition to security systems, these businesses typically have a separate and independent payroll system for tracking the attendance of employees for the purposes of compensation and evaluating performance. For example, traditionally, business have relied on standalone time clocks to track employee attendance. While useful, these time clocks disadvantageously do not interface with other systems on-site at the premises. At most, other independent payroll systems communicate with an on-site payroll server such that a user can access payroll information via the internet or network. While these other payroll systems are able to communicate with on-site payroll servers, these other payroll systems remain independent in structure and function from security systems that monitor the businesses for alarm conditions. For example, an employee that arrives to open the business for the day first gains access to the business, and then disarms the security system, typically by entering a disarm code in a control panel of the security system located proximate the front of the business. With the security system disarmed, the employee walks to a break room where the standalone payroll system is located in order to clock-in to work. Employees arriving to work after the security system has been disarmed, simply go to the break room and clock-in to work via the standalone payroll system.

When it is time to close the business for the day, typically the last employee clocks-out via the standalone payroll system and then walks over toward the exit to arm the security system. Once the last employee causes the system to arm such as by entering an arming code, the last employee secures the premises, e.g., by locking door(s) and/or gate(s), and the security system monitors the premises until the security system is disarmed the following day. The security system disadvantageously functions independent of the payroll system and vice versa.

SUMMARY

The present invention advantageously provides a method and controller for a security system, and in particular to integrating security system functionality with timekeeping payroll functionality.

According to one or more embodiments of the invention, a controller is provided. The controller includes processing circuitry configured to activate premises security monitoring of a premises if the controller is armed. The processing circuity includes a memory and a processor. The memory contains instructions that, when executed by the processor, configure the processor to determine that data to disarm the controller has been received, disarm the controller based on the received data, and in response to disarming the controller, track timekeeping payroll records of a plurality of predefined users associated with the premises. The disarming of the controller deactivates premises security monitoring by the controller. The timekeeping payroll records includes at least one of clock-in data and clock-out data.

According to one or more embodiments of this aspect, the data to disarm the controller is received from one user of the plurality of predefined users. The receipt of the data to disarm the controller causes the clock-in data associated with the one user of the plurality of predefined users to be updated. According to one or more other embodiments of this aspect, premises security monitoring by the controller remains deactivated during the tracking of timekeeping payroll records of the plurality of predefined users at the premises.

According to another embodiment of this aspect, the memory includes further instructions that, when executed by the processor, configure the processor to determine that data to rearm the controller has been received, update clock-out data of the one of the plurality of predefined users associated with the data to rearm the controller, and in response to the determination that data to rearm the controller has been received, activate premises security monitoring by the controller. The data to rearm the controller is associated with one of the plurality of predefined users. According to another embodiment of this aspect, the tracking of timekeeping payroll records of the plurality of predefined users is disabled while the premises security monitoring by the controller is activated. According to another embodiment of this aspect, the clock-in data includes a time of clock-in and an employee identifier associated with the user clocking-in. The clock-out data includes a time of clock-out and an employee identifier associated with the user clocking-out.

According to another embodiment of this aspect, the memory further stores a plurality of payroll rules and contains further instructions that, when executed by the processor, configure the processor to: in response to the deactivating premises security monitoring by the controller, monitor the plurality of payroll rules, determine one of the plurality of payroll rules is not met, and in response to determining the one of the plurality of payroll rules is not met, cause transmission of an alert message. According to another embodiment of this aspect, the one of the plurality of payroll rules includes at least one predetermined time.

The one of the plurality of payroll rules not being met if a clock-in is received after the predetermined time. The alert message indicates the user of the plurality of predefined users that clocked-in after the predetermined time. According to another embodiment of this aspect, the one of the plurality of payroll rules includes at least one predetermined time. The one of the plurality of payroll rules not being met if a clock-out is received before the predetermined time. The alert message indicates the user of the plurality of predefined users that clocked-out before the predetermined time. According to another embodiment of this aspect, the one of the plurality of payroll rules includes at least one predetermined time. The one of the plurality of payroll rules not being met if at least one of the plurality of predefined users has not clocked-in by the predetermined time. The alert message indicates the at least one of the plurality of predefined users that has not clocked-in by the predetermined time.

According to one or more other embodiments of the invention, a method is provided. Premises security monitoring of a premises is activated if the controller is armed. A determination is made that data to disarm the controller has been received. The controller is disarmed based on the received data. The disarming of the controller deactivating premises security monitoring by the controller. In response to disarming the controller, timekeeping payroll records of a plurality of predefined users associated with the premises is tracked. The timekeeping payroll records includes at least one of clock-in data and clock-out data. According to one or more embodiments of this aspect, the data to disarm the controller is received from one user of the plurality of predefined users. The receipt of the data to disarm the controller causes the clock-in data associated with the one user of the plurality of predefined users to be updated. According to one or more other embodiments of this aspect, the premises security monitoring by the controller remains deactivated during the tracking of timekeeping payroll records of the plurality of predefined users at the premises.

According to one or more other embodiments of this aspect, a determination is made that data to rearm the controller has been received. The data to rearm the controller is associated with one of the plurality of predefined users. Clock-out data of the one of the plurality of predefined users associated with the data to rearm the controller is updated. In response to the determination that data to rearm the controller has been received, premises security monitoring by the controller is activated. According to one or more other embodiments of this aspect, the tracking of timekeeping payroll records of the plurality of predefined users is disabled while the premises security monitoring by the controller is activated. According to one or more other embodiments of this aspect, the clock-in data includes a time of clock-in and an employee identifier associated with the user clocking-in. The clock-out data includes a time of clock-out and an employee identifier associated with the user clocking-out.

According to one or more other embodiments of this aspect, a plurality of payroll rules are stored. In response to the deactivating premises security monitoring by the controller, the plurality of payroll rules are monitored. A determination is made that one of the plurality of payroll rules is not met. In response to determining the one of the plurality of payroll rules is not met, transmission of an alert message is caused. According to one or more other embodiments of this aspect, the one of the plurality of payroll rules includes at least one predetermined time. The one of the plurality of payroll rules not being met if a clock-in is received after the predetermined time. The alert message indicates the user of the plurality of predefined users that clocked-in after the predetermined time. According to one or more other embodiments of this aspect, the one of the plurality of payroll rules includes at least one predetermined time. The one of the plurality of payroll rules not being met if a clock-out is received before the predetermined time. The alert message indicates the user of the plurality of predefined users that clocked-out before the predetermined time. According to one or more other embodiments of this aspect, the one of the plurality of payroll rules includes at least one predetermined time. The one of the plurality of payroll rules not being met if at least one of the plurality of predefined users has not clocked-in by the predetermined time. The alert message indicates the at least one of the plurality of predefined users that has not clocked-in by the predetermined time.

According to one or more other embodiments of the invention, a controller is provided. The controller includes processing circuitry for activating security monitoring of a premises if the controller is armed. The processing circuity includes a memory configured to store a plurality of payroll rules and a processor. The memory contains instructions that, when executed by the processor, configure the processor to: determine that data to disarm the controller has been received, disarm the controller based on the received data, and in response to disarming the controller, track timekeeping payroll records of a plurality of predefined users associated with the premises. The disarming of the controller deactivates premises security monitoring by the controller. The timekeeping payroll records includes at least one of clock-in data and clock-out data. The memory contains further instructions that, when executed by the processor, configure the processor to: in response to the tracking of timekeeping payroll records, monitor the plurality of payroll rules, determine one of the plurality of payroll rules is not met, in response to determining the one of the plurality of payroll rules is not met, cause an alert message to be transmitted, determine that data to rearm the controller has been received from one of the plurality of predefined users, update clock-out data of the one of the plurality of predefined users associated with the data to rearm the controller, and in response to the determination that data to rearm the controller has been received, arm the controller and disabling timekeeping payroll record tracking, the arming of the controller activating premises security monitoring by the controller.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 7 is another exemplary screenshot of data displayed at a user device in accordance with the principles of the invention.

DETAILED DESCRIPTION

Figure 1:
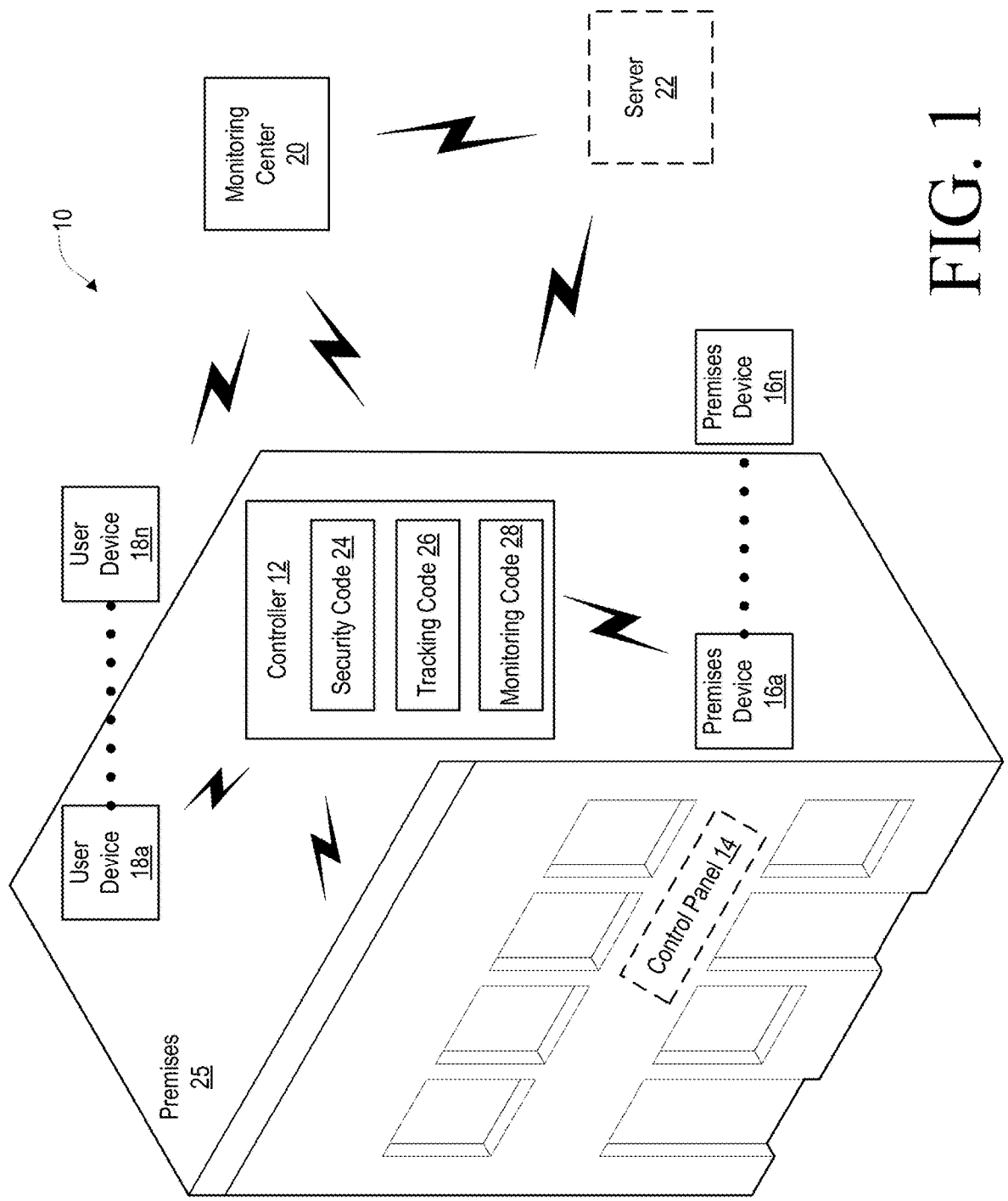
FIG. 1 is a block diagram of an exemplary system for security system monitoring and timekeeping payroll records tracking in accordance with the principles of the invention.

For simplicity and ease of explanation, the invention will be described herein in connection with various embodiments thereof. Those skilled in the art will recognize, however, that the features and advantages of the invention may be implemented in a variety of configurations. It is to be understood, therefore, that the embodiments described herein are presented by way of illustration, not of limitation.

Before describing in detail exemplary embodiments that are in accordance with the invention, it is noted that the embodiments reside primarily in combinations of device components and processing steps related to security monitoring of a premises and tracking of timekeeping payroll records. Accordingly, components have been represented where appropriate by conventional symbols in the drawings, showing only those specific details that are pertinent to understanding the embodiments of the invention so as not to obscure the invention with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and would not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

The figures will be used to illustrate aspects of the invention. An exemplary embodiment of system 10 for providing security monitoring and timekeeping payroll record tracking is illustrated in FIG. 1. System 10 includes one or more controllers 12, one or more control panels 14, one or more premises devices 16a-16n (collectively referred to as premises device 16), one or more user devices 18a-18n (collectively referred to as user device 18), one or more monitoring centers 20 and one or more servers 22, in communication with each other and/or at least one element of system 10, via one or more communication networks and/or one or more communication protocols. In one or more embodiments, controller 12 communicates with control panel 14 in which control panel is configured to receive disarming data, arming data and timekeeping payroll data, and transmit this data to controller 12.

Controller 12 includes security code 24, such as computer executable programmatic code, for monitoring premises 25 via premises devices 16 as described below. Controller 12 further includes tracking code 26 that is configured to track timekeeping payroll records if security monitoring functionality associated with security code 24 is deactivated, i.e., if security functions of controller 12 have been deactivated, or controller 12 disarmed, in accordance with the principles of the invention. Tracking code 26 is discussed in detail with respect to FIGS. 3 and 4. In one or more embodiments, controller 12 includes monitoring code 28 that is configured to monitor at least one payroll rule in accordance with the principles of the invention. Monitoring code 28 is described in detail with respect to FIG. 5.

Control panel 14 is configured to receive data from a user, user device 18 and/or electronic tag via one or more input devices such as a key pad, near field communication reader, radio frequency identification reader, biometric reader and/or other device. In one or more embodiments, control panel 14 includes clock-in and clock-out button(s) for entering clock-in and clock-out data for an employee. In one or more embodiments, control panel 14 includes a display for presenting information to a user. In one or more other embodiments, an existing security system is modified to use a function key, as is known in the art, as clock-in and clock-out button(s). Control panel 14 transmits or forwards the received data to controller 12 for processing. Therefore, control panel 14 provides a point inside or proximate premises 25 where a user can input data such as data instructing controller 12 to disarm or arm controller 12 (i.e., deactivate or activate security monitoring) and/or other data such as payroll record data, described herein. In one or more embodiments, controller 12 and control panel 14 are integrated into the same device. It is understood, however, that implementations are not limited to arrangements where controller 12 and control panel 14 are integrated into the same physical device. Controller 12 and control panel 14 can be implemented as separate physical devices.

Figure 6:
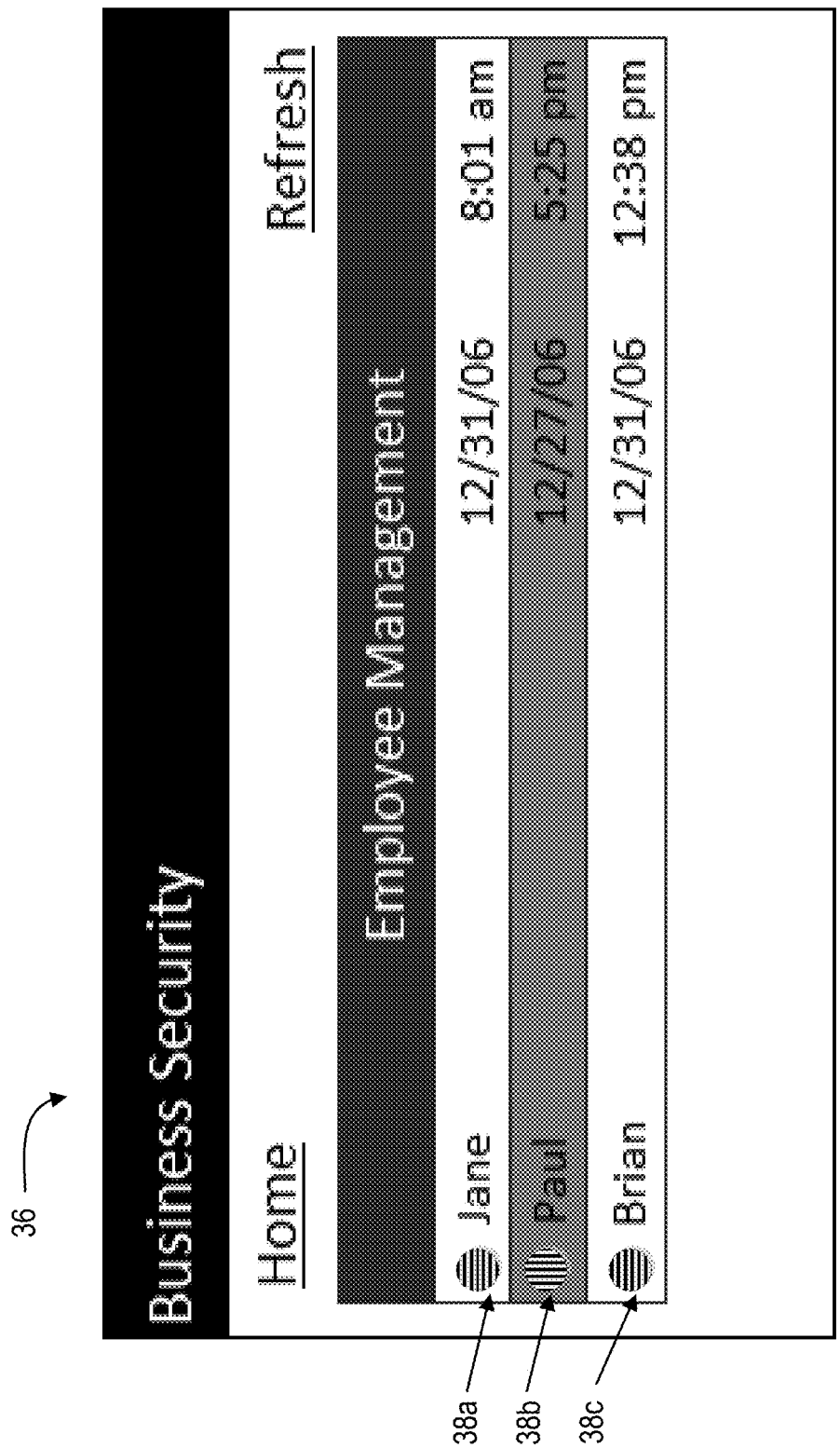
FIG. 6 is an exemplary screenshot of data displayed at a user device in accordance with the principles of the invention.

Premises devices 16a-16n are configured to monitor for one or more alarm conditions and report the monitoring results to controller 12 for processing as is well known in the art. For example, premises device 16 includes a motion sensor, window break sensor, window contact sensor, door contact sensor, among other sensors know in the art that can communicate sensor information to controller 12 for processing. System 10 includes one or more user devices 18 in communication with controller 12, monitoring center 20 and/or server 22, via one or more communication networks and/or one or more communication protocols. User devices 18 may include mobile phones, wireless devices and laptops, among other electronic devices that can communicate with one or more elements illustrated in system 10. In one or more embodiments, user device 18 includes a display for displaying data received from controller 12 and/or server 22 as illustrated in FIGS. 6 and 7.

System 10 includes monitoring center 20 that communicates with controller 12 and/or user device 18, among other elements of system 10. In one or more embodiments, monitoring center 20 is configured to receive security alerts generated by controller 12 and initiate first responder services as is well known in the art. In one or more embodiments, system 10 includes one or more servers 22 that are in communication with controller 12, user device 18 and/or monitoring center 20. In one or more embodiments, server 22 is configured to store various data associated with premises 25 and controller 12. For example, server 22 may store data related to deactivating security monitoring by controller 12 (i.e., disarming controller 12), activating security monitoring by controller 12 (i.e., arming controller 12), timekeeping payroll records and one or more payroll rules, among other data and rules that are accessible by controller 12 and/or user device 18. In one or more embodiments, server 22 is omitted such that data, e.g., disarm data, arm data, timekeeping records and employee data, are stored at controller 12.

Figure 2:
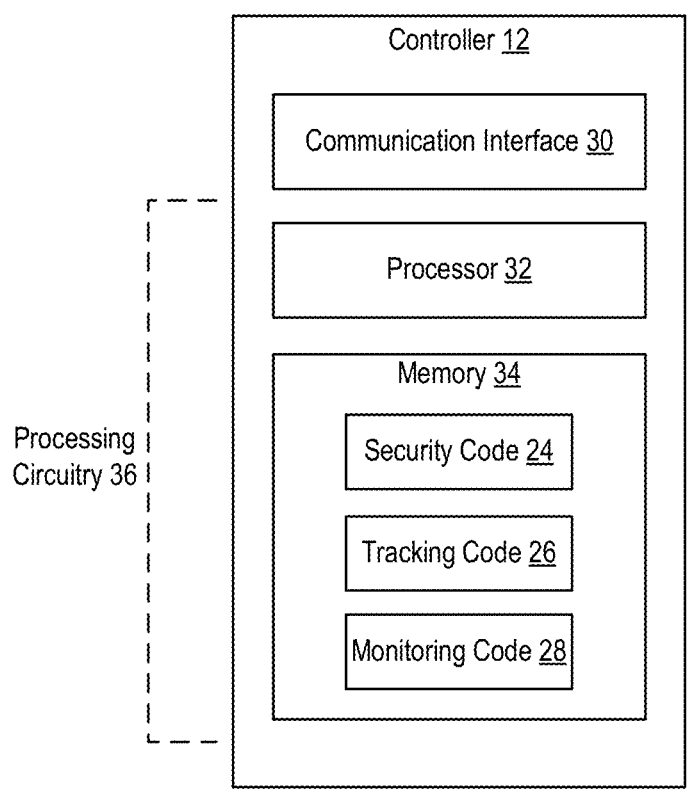
FIG. 2 is a block diagram of an exemplary controller for security system monitoring and timekeeping payroll records tracking in accordance with the principles of the invention.

FIG. 2 illustrates an exemplary embodiment of controller 12 in accordance with the principles of the invention. Controller 12 includes one or more communication interfaces 30 for communicating with one or more elements of system 10 such as with control panel 14 and user device 18, over one or more network and/or using one or more communication protocols. In one or more embodiments, communication interface 30 includes one or more transmitters for transmitting data and one or more receivers for receiving data. Controller 12 includes one or more processors 32 that execute computer program instructions stored in memory 34 to perform functions described herein with respect to controller 12. Memory 34 is configured to store programmatic, i.e., computer executable code such as security code 24, tracking code 26 and monitoring code 28. For example, security code 24 includes instructions that, when executed by processor 32, cause processor 32 to perform a security monitoring process for monitoring premises 25. Methods for monitoring security of a premises are well known in the art and are beyond the scope of the present disclosure. In one example, if controller 12 is armed such that security monitoring functionality of controller 12 is enabled, controller 12 monitors premises 25 and/or area(s) proximate premises 25 for one or more alarm conditions sensed by premises devices 16. In response to receiving an indication of an alarm condition from at least one premises device 16, in one or more embodiments, controller 12: transmits one or more alert messages to user device 18 and/or monitoring center 20, triggers an audio and/or visual indicators at premises 25, and/or perform other functions as are known in the art. In one or more embodiments, monitoring center 20 initiates first responders to premises 25 based on the received alert message from controller 12.

Figure 3:
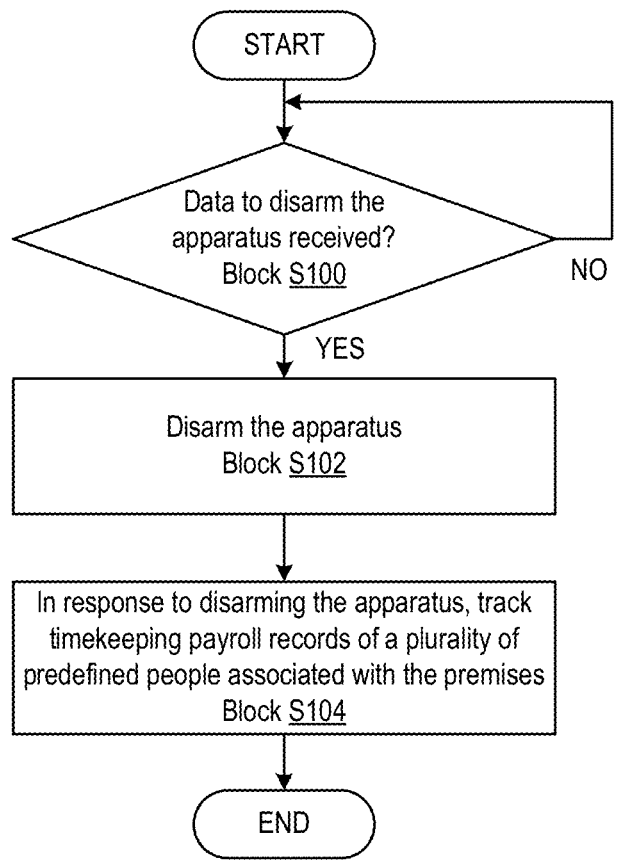
FIG. 3 is a flow diagram of an exemplary security monitoring deactivating process with timekeeping payroll record clock-in in accordance with the principles of the invention.

In one or more embodiments, tracking code 26 includes instructions that, when executed by processor 32, cause processor 32 to perform the timekeeping payroll record tracking process discussed in detail with respect to FIG. 3. In one or more embodiments, tracking code 26 includes instructions that, when executed by processor 32, cause processor 32 to perform the alternative timekeeping payroll record tracking process discussed in detail with respect to FIG. 4. In one or more embodiments, monitoring code 28 includes instructions that, when executed by processor 32, causes processor 32 to perform payroll rule monitoring process described in detail with respect to FIG. 5.

Figure 4:
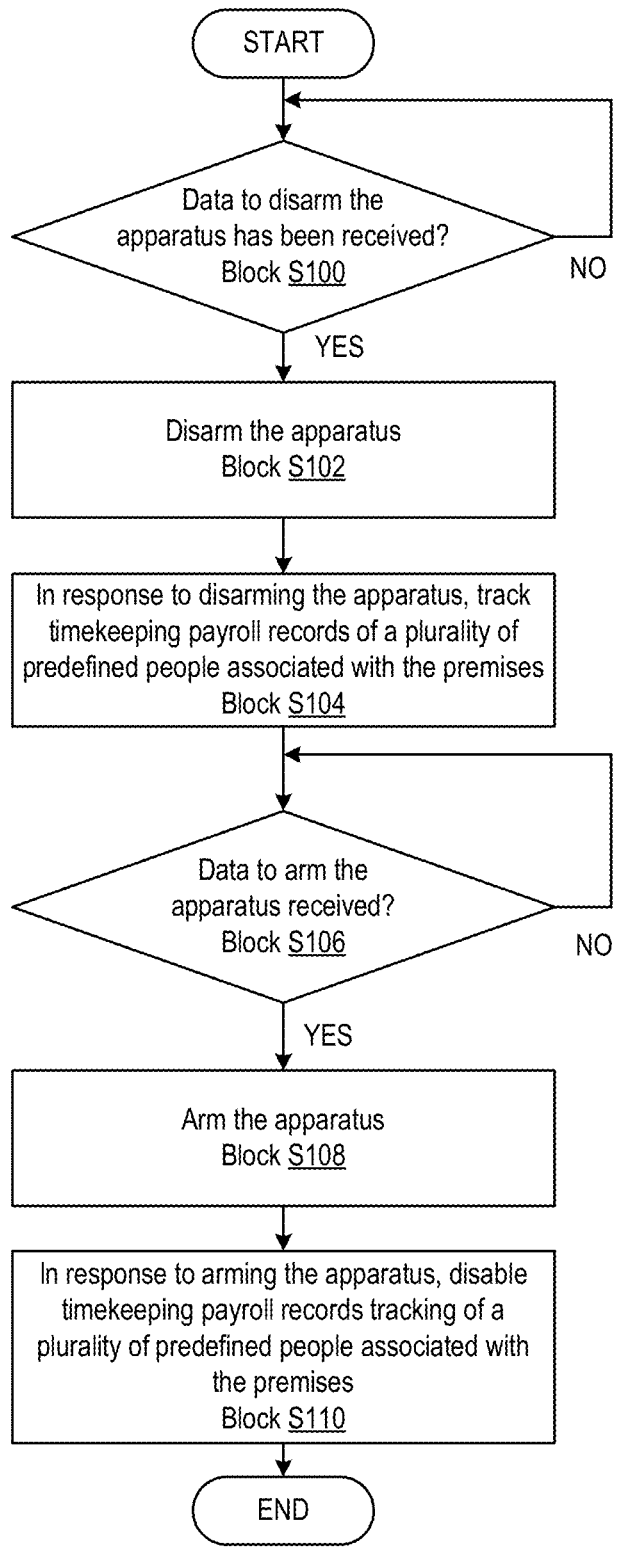
FIG. 4 is a flow diagram of an exemplary security monitoring deactivating and activating process with timekeeping payroll record clock-in an clock-out in accordance with the principles of the invention.
Figure 5:
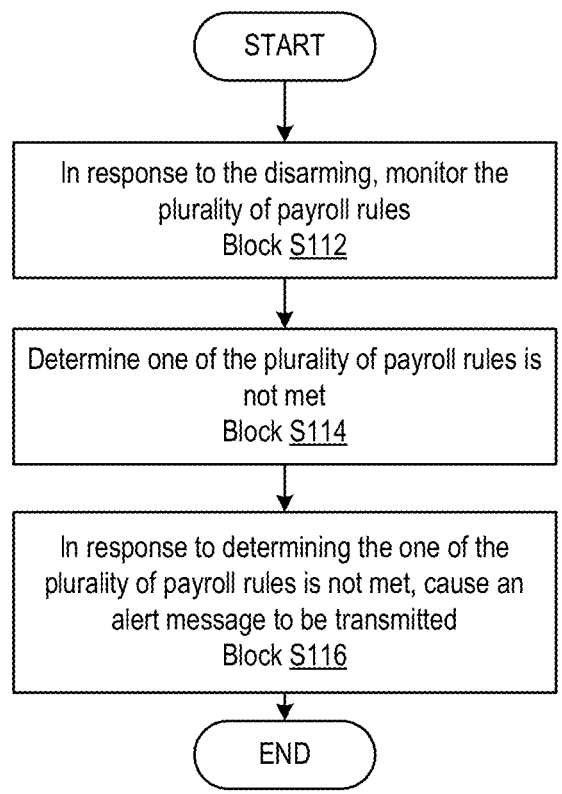
FIG. 5 is a flow diagram of an exemplary monitoring process in accordance with the principles of the invention.

In one or more embodiments, processor 32 and memory 34 form processing circuitry 36 that configure processor 32 to perform the one or more functions described with respect to FIGS. 3-5. In addition to a traditional processor and memory, processing circuitry 36 may comprise integrated circuitry for processing and/or control, e.g., one or more processors and/or processor cores and/or FPGAs (Field Programmable Gate Array) and/or ASICs (Application Specific Integrated Circuitry). Processing circuitry 36 may comprise and/or be connected to and/or be adapted for accessing (e.g., writing to and/or reading from) memory 34, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 34 may be adapted to store code executable by control circuitry and/or other data, e.g., data pertaining to communication, e.g., configuration and/or address data of nodes, etc. Processing circuitry 36 may be configured to control any of the methods described herein and/or to cause such methods to be performed, e.g., by controller 12. Corresponding instructions may be stored in the memory 34, which may be readable and/or readably connected to the processing circuitry 36. In other words, processing circuitry 36 may include a controller, which may comprise a microprocessor and/or microcontroller and/or FPGA (Field-Programmable Gate Array) device and/or ASIC (Application Specific Integrated Circuit) device. It may be considered that processing circuitry 36 includes or may be connected or connectable to memory, which may be adapted to be accessible for reading and/or writing by the controller and/or processing circuitry 36.

A security monitoring disarming process with timekeeping payroll record clock-in in accordance with the principles of the invention is described with reference to FIG. 3. In one or more embodiments, the timekeeping payroll record tracking processing is embodied in tracking code 26. Assume for this example that the security monitoring function is activated and an employee is arriving to disarm controller 12 thereby deactivating the security monitoring function. Processing circuitry 36 determines whether data to disarm controller 12 has been received (Block S100). For example, controller 12 is monitoring premises 25 according to security code 24, i.e., controller 12 is armed such that security monitoring functionality is activated, when communication interface 30 of controller 12 receives data from control panel 14 to disarm controller 12, i.e., deactivate security monitoring functionality of controller 12. In one or more embodiments, the data to disarm controller 12 is received, via control panel 14, such as from one of a plurality of predefined users associated with premises 25. In one or more embodiments, the plurality of predefined users associated with premises 25 are defined in memory 34 and/or server 22 such that only these authorized users such as employees may access controller 12 functionality and/or submit data timekeeping payroll data. In one or more embodiments, the data to disarm controller 12 includes at least one of an employee identifier, passcode, date stamp and time stamp, among other data used by controller to determine whether to disarm controller 12, i.e., whether to deactivate security functionality of controller 12 that is associated with security code 24, and/or identification data of user. In one or more embodiments, the data to disarm controller 12 includes GPS or location data received from user device 18 that indicates user device 18 is at, proximate or within premises 25. In one or more embodiments, the GPS or location data is used by controller 12 to determine whether to deactivate security monitoring functions. For example, if the location data indicates the employee has entered premises 25, controller 12 determines to deactivate security monitoring functions, i.e., disarm controller 12. In one or more embodiments, the GPS or location data is received from a user device 18 associated with the employee, premises device 16 tracking or sensing the employee and/or other element associated with system 10 that is configured to transmit location data to controller 12. If processing circuitry 36 determines data to disarm controller 12 has not been received, processing circuitry 36 repeats the determination of Block S100.

If processing circuitry 36 determines data to disarm controller 12 has been received, processing circuitry 36 disarms controller 12 based on the received data, i.e., deactivates premises security monitoring by controller 12 (Block S102). For example, in one or more embodiments, processing circuitry 36 verifies that the received data includes a predefined pass code for disarming controller 12 such that controller 12 deactivates security monitoring functionality of controller 12. Processing circuitry 36, in response to disarming controller 12, tracks timekeeping payroll records of a plurality of predefined users associated with premises 25. In one or more embodiments, timekeeping payroll records include at least one of clock-in data and clock-out data. In one example, in response to security functionality associated with security code 24 being disabled/deactivated, processing circuitry 36 initiates tracking of timekeeping payroll records such as clock-in data and/or clock-out data of each of the plurality of predefined users or users of system 10, e.g., employees. As used herein, in one or more embodiments, clock-in refers to a user beginning or resuming work at premises 25. In one or more embodiments, clock-in refers to the user entering and/or leaving one or more predefined location within premises 25 such as an employee break room. Also as used herein, in one or more embodiments, clock-out refers to a user stopping or ending work at premises 25. In one or more embodiments, clock-out refers to the user entering and/or leaving one or more predefined location within premises 25 such as an employee leaving the break room. For example, during one work day, an employee can have multiple clock-ins and clock-outs.

In one or more embodiments, the data to disarm controller 12 is received from one users of the plurality of predefined users in which disarming of controller 12 causes clock-in data associated with the one user of the plurality of users, i.e., the user deactivating premises security monitoring function(s), to be updated. In other words, the user that disarmed controller 12 is automatically clocked-in for work in response to entry of a disarm code/data. Further, in one or more embodiments, deactivating of security functions of controller 12 triggers tracking of timekeeping payroll records for other users as described below with respect to FIG. 3. Therefore, deactivating or disabling security monitoring functionality of controller 12, i.e., disarming controller 12, triggers tracking of timekeeping payroll records such that security and payroll tracking functions are not only provided by controller 12, but payroll tracking functionality is activated and triggered by the disabling or deactivating of security monitoring functionality.

FIG. 4 is a flow diagram of another exemplary controller disarming and arming process with timekeeping payroll record clock-in and clock-out. In this example, assume disarming of controller 12 and employee tracking has taken place as described in FIG. 3 with respect to Blocks S100-S104, and a last employee is leaving for the day in which this employee is responsible for arming controller 12 such as to activate security monitoring functionality of controller 12. In one or more embodiments, this timekeeping payroll records tracking process illustrated in FIG. 4 is embodied in tracking code 26. Blocks S100-S104 are discussed above with respect to FIG. 3.

Processing circuitry 36 determines whether data to arm controller 12 has been received (Block S106). For example, controller 12 is tracking timekeeping payroll records according to tracking code 26, i.e., timekeeping payroll records tracking functionality is activated, when communication interface 30 of controller 12 receives data from control panel 14 to arm controller 12, i.e., activate security monitoring functionality of controller 12. In one or more embodiments, the data to arm controller 12 is received, via control panel 14, from one of a plurality of predefined users associated with premises 25. In one or more embodiments, the data to arm controller 12 includes at least one of an employee identifier, passcode, date stamp and time stamp, among other data for determining whether to arm controller 12, i.e., activate security functionality of controller 12 that is associated with security code 24, and/or for identifying the user. In one or more embodiment, the data to arm controller 12 is received from user device 18. For example, in one or more embodiments, user device 18 may transmit location data indicating that the employee is leaving or has left the building, thereby indicating that controller 12 should activate premises security monitoring functions. In other example, in one or more embodiments, user device 18 transmits at least one of an employee identifier, passcode, date stamp and time stamp, among other data for determining whether to arm controller 12, i.e., activate premises security monitoring functions at controller 12.

If processing circuitry 36 determines data to arm controller 12, i.e., activate security monitoring functionality, has not been received, processing circuitry 36 repeats the determination of Block S106. If processing circuitry 36 determines data to arm controller 12 has been received, processing circuitry 36 arms controller 12, i.e., activates security monitoring functionality. In one or more embodiments, processing circuitry 36 compares the received data with predefined arm/disarm data stored in memory 34 in order to verify that the received data is valid, i.e., verifies that the received passcode to arm/disarm controller 12 is valid, verifies a received employee identifier is associated with an employee that is expected to be a work on a specific day per a stored/accessible employee schedule and/or verifies the received employee identifier is valid, etc. In other words, in one or more embodiments, controller 12 verifies the received data to determine whether to arm controller 12 in which controller 12 may trigger a message or indication to be displayed by control panel 14, user device 18 and/or other element of system 10 depending on whether the received data was valid. For example, in one or more embodiments, an employee may be prompted to re-enter data if the received data was not valid in which the timekeeping payroll records tracking process may repeat the determination of Block S106.

In response to activating security monitoring functionality of controller 12, i.e., arming controller 12, processing circuitry 36 disables timekeeping payroll records tracking of a plurality of predefined users associated with premises 25 (Block S110). For example, in response to activating security monitoring functionality of controller 12, processing circuitry 36 deactivates/disables tracking functionality. In one or more embodiments, processing circuitry 36 performs the determination of Block S100 after disabling timekeeping payroll records tracking functionality, i.e., performs the determination of Block S100 after performing Block S110.

In one or more embodiments, the data to arm controller 12 is received from one user of the plurality of predefined users in which arming of controller 12 causes clock-out data associated with the one user of the plurality of users, i.e., the user arms the security monitoring function, to be updated. In other words, the user that armed controller 12 is clocked-out for work in response to entry of an arm code. Therefore, activating or enabling security monitoring functionality of controller 12 deactivates tracking of timekeeping payroll records. Controller 12 advantageously provides security and timekeeping payroll records tracking functions in which payroll tracking functionality is deactivated by the activating security monitoring functionality, and payroll tracking functionality is activated by deactivating security monitoring functionality.

Of note, although FIG. 4 shows both disarming and arming of controller 12, i.e., activating and deactivating of premises security monitoring, and activation and deactivation of payroll records tracking, it is understood that, like FIG. 3, blocks S106-S110 can be implemented separately from blocks S100-S104. In other words, blocks S100-S104 do not have to precede blocks S106-S110 such that arming can occur before disarming, etc.

FIG. 5 illustrates a flow diagram of an exemplary monitoring process in accordance with the principles of the invention. In one or more embodiments, the monitoring process is embodied in monitoring code 28. Processing circuitry 36, in response to deactivating security monitoring functionality of controller 12, monitors a plurality of payroll rules stored in memory 34 (Block S112). In one or more embodiments, one of the plurality of payroll rules includes at least one predetermined time in which the one of the plurality of payroll rules is not met if a clock-in is received after the predetermined time. For example, an employee or worker clocks-in via control panel 14 or other method described herein in which clock-in data such as the time of clock-in and employee identifier is communicated to controller 12. Based on the received clock-in data, controller 12 determines that an employee associated with the employee identifier clocked-in late or after the predetermined time. If the employee is the first employee and disarms controller 12 thereby deactivating the premises security monitoring functions, then the received clock-in data also indicates the time the business was opened. In this example, controller 12, using one or more other payroll rules, determines if the business was opened on time by comparing this clock-in data of this specific employee to the predetermined time indicated in the other one or more payroll rules.

In one or more other embodiments, one of the plurality of payroll rules includes at least one predetermined time in which the one of the plurality of payroll rules is not met if a clock-out is received before the predetermined time. For example, an employee or worker clocks-out via control panel 14 or other method described herein in which the time of clock-out and employee identifier is communicated to controller 12. Based on the received clock-out data, controller 12 determines that an employee associated with the employee identifier clocked-out early or before the predetermined time. In one or more embodiments, one of the plurality of payroll rules includes a time window from a predetermined time in which at least one of the plurality of predefined users are required to clock-in before the end of the time window in order for the payroll rule to be met. For example, if user "Jane" is to clock-in at 8 am, a payroll rule may set up an alert for 5 minutes after 8 am. If Jane were to clock in at 8:07 am, then the payroll rule would not be met and an alert may be transmitted due to the payroll rule not being met, as discussed below. One of ordinary skill in the art will recognize that the examples of payroll rules described herein may be reversed such that being late equates to a payroll rule being met. In general, a payroll rule being met or not being met means that a comparison between one or more parameters in a payroll rule and the received data indicates the received data meets or does not meet the one or more parameters of the payroll rule.

In one or more other embodiments, a payroll rules engine evaluates the payroll rules by applying the received clock-in data and/or clock-out data to determine if one or more payroll rules are met and/or not met. The payroll rules engine may include one or more logic functions and mathematical expressions that are applied to data received from control panel 14 and/or user device 18, among other electronics devices associated with premises 25 that are configured to receive data from one of the plurality of predefined users. The logic functions and mathematical expressions of the payroll rules engine may be created, deleted and modified by one or more users with sufficient permissions to do so. In one embodiment, the processing rules engine is implemented by processing circuitry 36 in controller 12. However, it is contemplated that the processing rules engine may be implemented by a device other than controller 12 in which the results are then transmitted or otherwise provided to controller 12.

Processing circuitry 36 determines one of the plurality of payroll rules is not met (Block S114). In response to determining one of the plurality of payroll rules is not met, processing circuitry 36 causes an alert message to be transmitted (Block S116). In one or more embodiments, the alert message includes at least one of an employee identifier, at least a portion of the data received at controller 12 and/or at least one payroll rule that was not met, among other information/data associated with the triggering of the alert message. In one or more embodiments, the alert message is transmitted to user device 18, user device 18 associated with a supervisor, user device 18 associated with an employer, monitoring center 20, and/or other electronic device associated with premises 25. The alert message advantageously notifies one or more user devices 18 when a payroll rule is not met such that a business owner or user is able to keep track and access timekeeping payroll records. In one or more embodiments, data stored in controller 12 and/or server 22 that is related to one or more employees may be periodically or on-demand transmitted to user device 18 such that user device 18 may display information about various employees as discussed in detail with respect to FIGS. 6 and 7.

FIG. 6 illustrates an exemplary screen shot 36 of data displayed at user device 18. In particular, user device 18 receives data from controller 12 such as timekeeping payroll records and updates for display on display of user device 18. Data for one or more predefined users are displayed in a display of user device 18. For example, data associated with Jane such as date of a clock-in, a time of clock-in and indicator 38 as to whether timekeeping payrolls records associated with Jane do not meet one or more predefined payroll rules is displayed. In this example, indicator 38 having a horizontal line pattern indicates the payrolls rules have been met. In another example, data associated with Paul such as a time of clock-out, date of the time of clock-out and indicator 38b as to whether timekeeping payroll records associated with Paul do not meet one or more predefined payroll rules is displayed. In this example, indicator 38b having a vertical line pattern indicates at least one payroll rule has not been met. In yet another example, data associated with Brian such as date of a clock-out, a time of clock-out and indicator 38c as to whether timekeeping payrolls records associated with Brian do not meet one or more predefined payroll rules is displayed. In this example, indicator 38c having a horizontal line pattern indicates the payroll rules have been met. Other data related to the timekeeping payroll records and security monitoring functions may also be displayed based on design choice.

FIG. 7 illustrates another screen shot 40 of data displayed on a display of user device 18. The screen shot includes data corresponding to security functions and timekeeping payroll record functions in which alerts and/or updates are illustrated. For example, in one or more embodiments, a payroll rule defines that employees are required to clock-in by noon (12 pm) in order for the payroll rule to be met, else the payroll rule will not be met for those employees clocking-in after noon. Controller 12 applying this payroll rule to the clock-in data indicated in screenshot 40, determines that clock-in data associated with Paul does not meet this payroll rule as Paul clocked-in after noon. Further, controller 12 applying this payroll rule to the clock-in data indicated in screenshot 40, determines that clock-in data associated with Jane and Brian meets this payroll rule as both Jane and Brian clocked-in before noon. Therefore, indicators 38a and 38c associated with Jane and Brian, respectively, will indicate this payroll rule has been met while indicator 38b associated with Paul will indicate this payroll rule has not been met. Further, user device 18 may access and update data stored in controller 12 and/or server 22. For example, a user may access data stored in controller 12 in order to update employee records, employee records, payroll rules, disarm/arm codes and/or other data/rules that are used by the processes of codes 24, 26 and/or 28.

Further, screenshot 40 shows various tabs that allow certain data to be displayed. For example, as explained above, a user may see which employees are on site at any given time. Further, the user may select a particular employee, e.g., Paul, such that Paul's clock-in/clock-out times for the day are displayed. In other words, employee timekeeping payroll records are displayed in real-time such that a user may see which employees are onsite at premises 25. In one or more embodiments, the timekeeping payroll records are displayed in a spreadsheet format such as clock-ins/outs for the week. In one or more embodiments, previous timekeeping payroll records stored at controller 12 and/or server 22 are searchable by the user. The spreadsheet may be printed out and save for the employer to keep on hand for record purposes.

Therefore, the invention advantageously ties activating/deactivating of premises security monitoring functions of controller 12 to the enabling/disabling of timekeeping payroll record functions and even simultaneously clocking employees in and out, i.e., ties arming/disarming of controller 12 to enabling/disabling of timekeeping payroll record functions and even simultaneously clocking employees in and out. In particular, the system and method described herein helps reduce fraudulent timekeeping entries by disabling timekeeping payroll record keeping functions when security monitoring functions are activated, i.e., prevents late punch-outs and early punch-ins. Further, the invention advantageously provides important business metrics such as the exact time the business opened as the first clock-in by an authorized employee will deactivate security monitoring functions and also clock-in the employee. Another business metric provided by the system and method described herein is the exact time the business closed as the final clock-out for the day will arm the security monitoring functions and also clock-out the employee. Further, the business owner will know at what time the security functions were activated based on the final clock-out.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing controller to produce a machine, such that the instructions, which execute via the processor of the computer or other programmable data processing controller, create means for implementing the functions/acts specified in the flowchart and/or block diagram block or blocks.

These computer program instructions may also be stored in a computer readable memory that can direct a computer or other programmable data processing controller to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing controller to cause a series of operational steps to be performed on the computer or other programmable controller to produce a computer implemented process such that the instructions which execute on the computer or other programmable controller provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the invention, which is limited only by the following claims.

What is claimed:

1. A premises controller for a premises security system, the premises controller comprising:
   processing circuitry configured to activate premises security monitoring of a premises if the premises controller is armed, the processing circuitry including a memory and a processor, the memory containing instructions that, when executed by the processor, configure the processor to:
      determine that data to disarm the premises controller has been received;
      disarm the premises controller based on the received data, the disarming of the premises controller deactivating premises security monitoring by the premises controller;
      in response to disarming the premises controller, generate and track timekeeping payroll records of a plurality of predefined users associated with the premises, the timekeeping payroll records including at least one of clock-in data and clock-out data;
      determine that data to rearm the premises controller has been received, the data to rearm the premises controller being associated with one of the plurality of predefined users;
      update clock-out data of the one of the plurality of predefined users associated with the data to rearm the premises controller; and
      in response to the determination that data to rearm the premises controller has been received, stop generating and tracking the timekeeping payrolls records of the plurality of predefined users and activate premises security monitoring by the premises controller.

2. The premises controller of claim 1, wherein the data to disarm the premises controller is received from one user of the plurality of predefined users, the receipt of the data to disarm the premises controller causing the clock-in data associated with the one user of the plurality of predefined users to be updated.

3. The premises controller of claim 1, wherein premises security monitoring by the premises controller remains deactivated during the tracking of timekeeping payroll records of the plurality of predefined users at the premises.

4. The premises controller of claim 1, wherein the tracking of timekeeping payroll records of the plurality of predefined users is disabled while the premises security monitoring by the premises controller is activated.

5. The premises controller of claim 1, wherein the clock-in data includes a time of clock-in and an employee identifier associated with the user clocking-in; and
the clock-out data includes a time of clock-out and an employee identifier associated with the user clocking-out.

6. The premises controller of claim 1, wherein the memory further:
   stores a plurality of payroll rules; and
   contains further instructions that, when executed by the processor, configure the processor to:
      in response to the deactivating premises security monitoring by the premises controller, monitor the plurality of payroll rules;
      determine one of the plurality of payroll rules is not met; and
      in response to determining the one of the plurality of payroll rules is not met, cause transmission of an alert message.

7. The premises controller of claim 6, wherein the one of the plurality of payroll rules includes at least one predetermined time, the one of the plurality of payroll rules not being met if a clock-in is received after the predetermined time; and
   the alert message indicating the user of the plurality of predefined users that clocked-in after the predetermined time.

8. The premises controller of claim 6, wherein the one of the plurality of payroll rules includes at least one predetermined time, the one of the plurality of payroll rules not being met if a clock-out is received before the predetermined time; and
   the alert message indicating the user of the plurality of predefined users that clocked-out before the predetermined time.

9. The premises controller of claim 6, wherein the one of the plurality of payroll rules includes at least one predetermined time, the one of the plurality of payroll rules not being met if at least one of the plurality of predefined users has not clocked-in by the predetermined time; and
   the alert message indicating the at least one of the plurality of predefined users that has not clocked-in by the predetermined time.

10. A method, the method comprising:
   activating premises security monitoring of a premises if a premises controller for a premises security system is armed;
   determining that data to disarm the premises controller has been received;
   disarming the premises controller based on the received data, the disarming of the premises controller deactivating premises security monitoring by the premises controller;
   in response to disarming the premises controller, generating and tracking timekeeping payroll records of a plurality of predefined users associated with the premises, the timekeeping payroll records including at least one of clock-in data and clock-out data;
   determining that data to rearm the premises controller has been received, the data to rearm the premises controller being associated with one of the plurality of predefined users;
   updating clock-out data of the one of the plurality of predefined users associated with the data to rearm the premises controller; and
   in response to the determination that data to rearm the premises controller has been received, stop generating and tracking the timekeeping payrolls records of the plurality of predefined users and activate premises security monitoring by the premises controller.

11. The method of claim 10, wherein the data to disarm the premises controller is received from one user of the plurality of predefined users, the receipt of the data to disarm the premises controller causing the clock-in data associated with the one user of the plurality of predefined users to be updated.

12. The method of claim 10 further comprising the premises security monitoring by the premises controller remaining deactivated during the tracking of timekeeping payroll records of the plurality of predefined users at the premises.

13. The method of claim 10, wherein the tracking of timekeeping payroll records of the plurality of predefined users is disabled while the premises security monitoring by the premises controller is activated.

14. The method of claim 10, wherein the clock-in data includes a time of clock-in and an employee identifier associated with the user clocking-in; and the clock-out data includes a time of clock-out and an employee identifier associated with the user clocking-out.

15. The method of claim 10, further comprising:
storing a plurality of payroll rules; and
in response to the deactivating premises security monitoring by the premises controller, monitoring the plurality of payroll rules;
determining one of the plurality of payroll rules is not met; and
in response to determining the one of the plurality of payroll rules is not met, causing transmission of an alert message.

16. The method of claim 15, wherein the one of the plurality of payroll rules includes at least one predetermined time, the one of the plurality of payroll rules not being met if a clock-in is received after the predetermined time; and the alert message indicating the user of the plurality of predefined users that clocked-in after the predetermined time.

17. The method of claim 15, wherein the one of the plurality of payroll rules includes at least one predetermined time, the one of the plurality of payroll rules not being met if a clock-out is received before the predetermined time; and the alert message indicating the user of the plurality of predefined users that clocked-out before the predetermined time.

18. The method of claim 15, wherein the one of the plurality of payroll rules includes at least one predetermined time, the one of the plurality of payroll rules not being met if at least one of the plurality of predefined users has not clocked-in by the predetermined time; and the alert message indicating the at least one of the plurality of predefined users that has not clocked-in by the predetermined time.

19. A premises controller for a premises security system, the premises controller comprising:

processing circuitry for activating security monitoring of a premises if the premises controller is armed, the processing circuitry including a memory configured to store a plurality of payroll rules and a processor, the memory containing instructions that, when executed by the processor, configure the processor to:

determine that data to disarm the premises controller has been received;

disarm the premises controller based on the received data, the disarming of the premises controller deactivating premises security monitoring by the controller; and in response to disarming the premises controller, generate and track timekeeping payroll records of a plurality of predefined users associated with the premises, the timekeeping payroll records including at least one of clock-in data and clock-out data;

in response to the tracking of timekeeping payroll records, monitor the plurality of payroll rules;

determine one of the plurality of payroll rules is not met;

in response to determining the one of the plurality of payroll rules is not met, cause an alert message to be transmitted;

determine that data to rearm the premises controller has been received, the data to rearm the premises controller being associated with one of the plurality of predefined users;

update clock-out data of the one of the plurality of predefined users associated with the data to rearm the premises controller; and in response to the determination that data to rearm the premises controller has been received, stop generating and tracking the timekeeping payrolls records of the plurality of predefined users and activate premises security monitoring by the premises controller.

* * * * *